United States Patent
Mishima

(10) Patent No.: US 9,503,014 B2
(45) Date of Patent: Nov. 22, 2016

(54) GEARED MOTOR UNIT HAVING FUNCTION FOR LIMITING THRUST LOAD

(71) Applicant: FANUC CORPORATION, Yamanashi (JP)

(72) Inventor: Yamato Mishima, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 14/725,606

(22) Filed: May 29, 2015

(65) Prior Publication Data

US 2015/0357962 A1     Dec. 10, 2015

(30) Foreign Application Priority Data

Jun. 5, 2014  (JP) .................................. 2014-117022

(51) Int. Cl.
*H02P 7/00*     (2016.01)
*H02P 29/02*    (2016.01)

(52) U.S. Cl.
CPC ........... *H02P 29/028* (2013.01); *H02P 29/032* (2016.02)

(58) Field of Classification Search
CPC ............................ H02P 29/08; B62D 5/0463
USPC ............ 318/400.01, 400.14, 400.15, 400.22, 318/430, 432, 437, 700, 701, 799, 560, 561, 318/680, 689; 384/105, 121, 161, 188, 194; 73/112.04; 310/156.04; 408/121; 416/43; 417/365
See application file for complete search history.

(56) References Cited

U.S. PATENT DOCUMENTS

2015/0306671 A1* 10/2015 Ichikawa ........... G05B 19/4166
                                                     82/118

FOREIGN PATENT DOCUMENTS

JP          60129453 A      7/1985
JP        2003322223 A     11/2003

OTHER PUBLICATIONS

English Abstract and Machine Translation for Japanese Publication No. 2003-322223 published Nov. 14, 2003, 10 pgs.
English Abstract for Japanese Publication No. 60-129453 published Jul. 10, 1985, 1 pg.

* cited by examiner

*Primary Examiner* — Antony M Paul
(74) *Attorney, Agent, or Firm* — Fredrikson & Byron, P.A.

(57) ABSTRACT

A compact geared motor unit, capable of properly protecting an electric motor without disengaging gears or suspending the unit, even when a thrust force larger than an allowable value is generated. The geared motor unit 10 has an electric motor and a gear configured to generate a thrust force applied to the electric motor when transmitting a torque, and a control section for controlling the electric motor. The control section has a thrust load obtaining part which obtains a thrust load of the electric motor at predetermined timings or time intervals; a critical thrust load storing part which stores a critical thrust load of the electric motor; and a torque limiting part which electrically limits the torque of the electric motor when the obtained thrust load exceeds the stored critical thrust load.

4 Claims, 1 Drawing Sheet

| | MODEL | PARAMETER NUMBER | VALUE OF CRITICAL THRUST LOAD [N] |
|---|---|---|---|
| MOTOR 32 | A | 1 | 100 |
| MOTOR 34 | B | 2 | 10 |
| MOTOR 36 | A | 1 | 100 |
| MOTOR 38 | C | 3 | 80 |

GEARED MOTOR UNIT HAVING FUNCTION FOR LIMITING THRUST LOAD

BACKGROUND OF THE INVENTION

1. Field of the Invention

The present invention relates to a geared motor unit having a function for limiting a thrust load applied to a motor when transmitting power to the motor via a gear.

2. Description of the Related Art

In an electric motor having a structure for applying a constant preload to a bearing for supporting a rotor, when the preload is not applied to the bearing, the rotor may fluctuate and as a result the motor may be damaged or broken. In a geared motor in which a gear is attached to an electric motor, a thrust load may be generated in a direction so as to cancel the preload, due to the rotation of the motor, depending on the type of gear. When the generated thrust load is larger than an allowable torque, the stiffness of the motor may be lowered and the motor may fluctuate due to disturbance, whereby the motor may be damaged.

In the prior art, a technique for protecting a geared motor from a thrust load larger than an allowable torque has been proposed. For example, JP 2003-322223 A discloses a gear unit wherein an annular projection formed on an inner periphery of a shaft hole of a helical gear is engaged with a groove formed on an outer periphery of a drive shaft to which the helical gear is attached, and the annular projection is disengaged from the groove when an axial thrust force exceeds a certain limit value.

Further, JP S60-129453 A discloses a gear transmission for transmitting torque by engaging helical gears, wherein the gear transmission includes a load cell configured to detect an excess thrust force due to an excess torque and transmit an operation stop signal.

The geared unit of JP 2003-322223 A can be prevented from being damaged by disengaging the helical gear from the drive shaft. Therefore, it is necessary to fit the helical gear with the drive shaft once again, which is troublesome. On the other hand, in the gear transmission of JP S60-129453 A, the operation of a machine including the gear transmission is stopped each time a thrust force larger than a limit value is generated, which may reduce operation efficiency of the machine.

Alternatively, a torque limiter may be used for a geared unit, by which a torque of an electric motor is limited so that a load applied thereto does not exceed an allowable torque. However, in this case, it is necessary to prepare a space for positioning the torque limiter, between the motor and a transmission or between the transmission and a driven object, resulting in an increase in size of the unit.

SUMMARY OF THE INVENTION

An object of the present invention is to provide a compact geared motor unit, capable of properly protecting an electric motor without disengaging gears or suspending the unit, even when a thrust force larger than an allowable value is generated.

According to the present invention, a geared motor unit, comprising: an electric motor; a gear connected to the electric motor so that a thrust load is applied to the electric motor when transmitting a torque; and a control section which controls the electric motor, wherein the control section comprises: a thrust load obtaining part which obtains a thrust load of the electric motor; a critical thrust load storing part which stores a critical thrust load of the electric motor; and a torque limiting part which electrically limits the torque of the electric motor when the thrust load of the electric motor obtained by the thrust load obtaining part exceeds the critical thrust load of the electric motor stored in the critical thrust load storing part, is provided.

In a preferred embodiment, the thrust load obtaining part calculates the thrust load of the electric motor based on the torque of the electric motor obtained by the control section and information regarding a dimension of the gear.

Alternatively, the thrust load obtaining part may obtain the thrust load of the electric motor as a detected value of a thrust load detector which detects the thrust load of the electric motor.

In a preferred embodiment, the critical thrust load storing part stores a value of the critical thrust load which is predetermined depending on a type of the electric motor.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
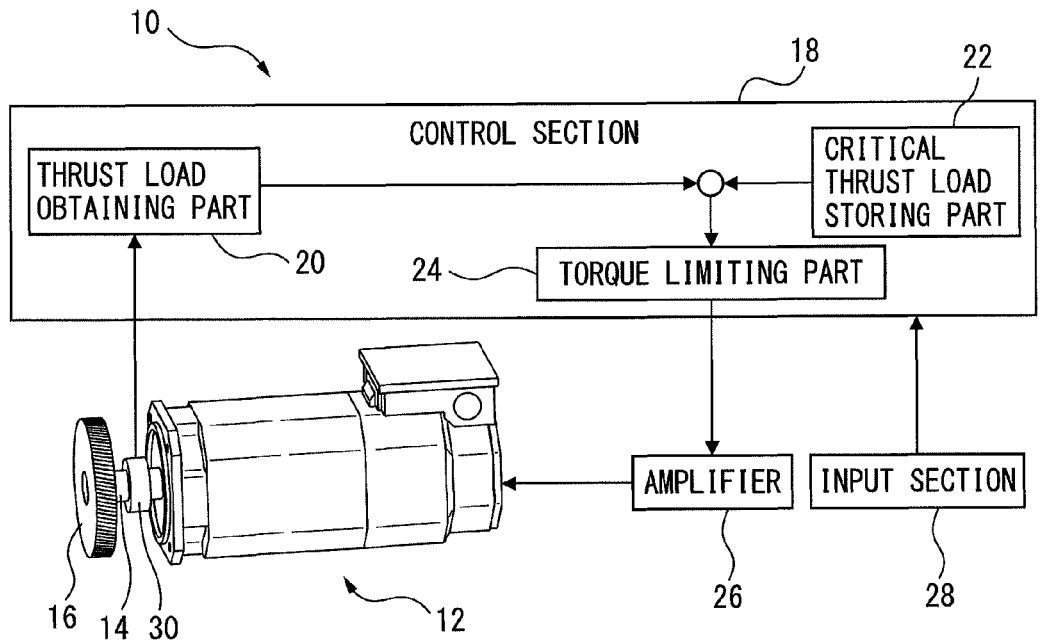
FIG. 1 shows a schematic configuration of a geared motor unit according to a preferred embodiment of the present invention.

FIG. 1 shows a schematic configuration of a geared motor unit 10 according to a preferred embodiment of the present invention. Geared motor unit 10 has an electric motor 12 and a gear 16 connected to a drive shaft 14 of electric motor 12. Gear 16 may be a helical gear, a straight bevel gear, a worm gear or a screw gear, etc., and is configured to generate a force in the axial direction (or a thrust force) applied to electric motor 12 when a torque of electric motor 12 is transmitted to a driven object (not shown) engaged with gear 16.

Geared motor unit 10 has a control section 18 for controlling electric motor 12. Control section 18 has a thrust load obtaining part 20 which obtains a thrust load of electric motor 12 at predetermined timings or time intervals; a critical thrust load storing part 22 which stores a critical thrust load of electric motor 12; and a torque limiting part 24 which electrically limits the torque of electric motor 12 when the thrust load of electric motor 12 obtained by thrust load obtaining part 20 exceeds the critical thrust load of electric motor 12 stored in critical thrust load storing part 22. In the embodiment of FIG. 1, torque limiting part 24 transmits a (normal) torque command to an amplifier 26 of electric motor 12 at predetermined time intervals or transmits a limited torque command to amplifier 26 when the thrust load exceeds the critical thrust load of electric motor 12 stored in thrust load storing part 22.

Also, geared motor unit 10 may have an input section 28, such as a keyboard or a touch panel, etc., capable of being operated by an operator. In this case, the operator can input various information (for example, a type of the electric motor as explained below) and/or commands to control section 18 via input section 28.

Next, a working example, in which thrust load obtaining part 20 obtains the thrust load of electric motor 12, will be explained. As shown in FIG. 1, by using a thrust load detector 30 (in the drawing, detector 30 is attached to drive shaft 14) for measuring the thrust load of electric motor 12, thrust load obtaining part 20 may obtain a detected value (or an output) of thrust load detector 30 as the thrust load applied to the motor. In addition, a commercially available detector may be used as thrust load detector 30.

Alternatively, thrust load obtaining part 20 may calculate thrust load Fx based on information (characteristic values) regarding the dimension of gear 16 and torque T of electric motor 12 obtained by control section 18, and may obtain calculated thrust load Fx as the thrust load of electric motor 12. In this regard, the information of gear 16 may include the type of the gear and characteristic values such as a dimension of each portion of the gear. Concretely, regarding the helical gear, the straight bevel gear, the worm gear and the screw gear as described above, thrust load Fx can be calculated by using following equations (1) to (4), respectively. As torque T, a feedback value (or a torque detected value) used to control electric motor 12 may be used, or, a calculated value by using necessary information, including a current value, a rotational frequency and an amount of slip, may be used, or, a torque command value for amplifier 26 may be used.

The meanings of characters in equations (1) to (4) are as follows. In this regard, a sign (or a direction) of the thrust load is determined by a helix direction of the gear.

Friction coefficient: $\mu$
Diameter of reference circle: d [mm]
Face width: b [mm]
Teeth number: z
Pressure angle: $\alpha$
Helix angle: $\beta$
Normal pressure angle: $\alpha n$
Module: m [mm]
Torque: T [N·m]

When gear 16 is a helical gear, equation (1) is true.

$$Fx = (2000 \times T/d) \times \tan(\beta) \quad (1)$$

When gear 16 is a straight bevel gear, equation (2) is true.

$$Fx = (2000 \times T/(d - b \cdot \sin(\tan^{-1}(z1/z2)))) \times \tan(\alpha) \times \sin(\tan^{-1}(z1/z2)) \quad (2)$$

Regarding equation (2), character "z1" means a teeth number of a driving gear (i.e., gear 16 attached to electric motor 12), and character "z2" means a teeth number of a driven gear (not shown).

When gear 16 is a worm gear, equation (3) is true.

$$Fx = (2000 \times T/d) \times (\cos(\alpha n) \times \cos(\tan^{-1}(m \times z/d)) - \mu \cdot \sin(\tan^{-1}(m \times z/d))) / (\cos(\alpha n) \times \sin(\tan^{-1}(m \times z/d)) - \mu \cdot \cos(\tan^{-1}(m \times z/d))) \quad (3)$$

When gear 16 is a screw gear, equation (4) is true.

$$Fx = (2000 \times T/d) \times (\cos(\alpha n) \times \sin(\beta) - \mu \cdot \cos(\beta)) / (\cos(\alpha n) \times \cos(\beta) + \mu \cdot \sin(\beta)) \quad (4)$$

As explained above, thrust load obtaining part 20 can obtain (or calculate) the thrust load of electric motor 12, based on the information of gear 16 and the torque of electric motor 12, without using thrust load detector 30 as shown in FIG. 1. The operator may input the information of gear 16 to control section 18 via input section 28, etc., as described above. Alternatively, the information of gear 16 may be previously stored in a proper storing device such as a memory, etc., and when the operator designates (or inputs) the type of the gear, thrust load obtaining part 20 may extract the information of the gear corresponding to the designated type from the storing device so as to calculate the thrust load.

Figure 2:
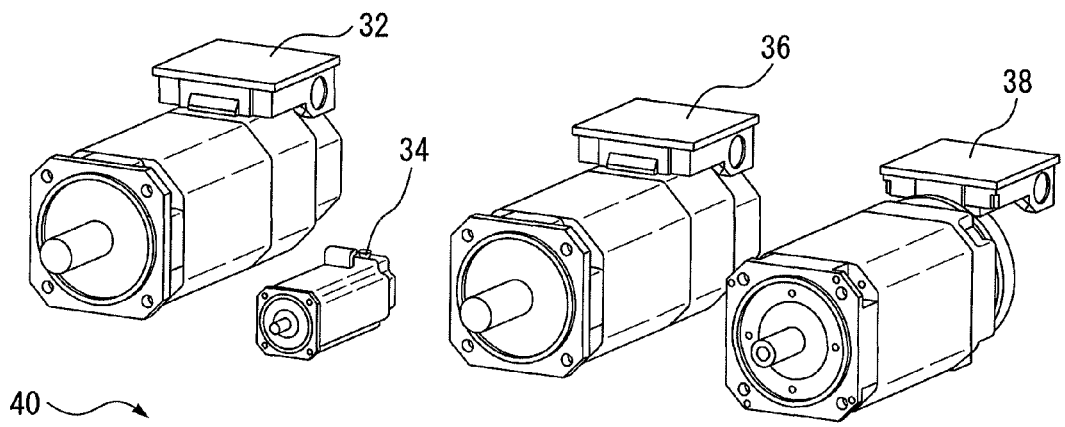
FIG. 2 shows various types of electric motors used for the geared motor unit of FIG. 1, and shows a table representing a critical thrust load of each electric motor depending on the type thereof.

The critical thrust load stored in critical thrust load storing part 22 means a threshold value predetermined depending on the type of electric motor 12, wherein electric motor 12 may be damaged or broken when the thrust load applied to the electric motor exceeds the threshold value. For example, as shown in FIG. 2, when four motors 32, 34, 36 and 38 are specified as motors capable of being applied to electric motor 12 of FIG. 1, a relationship between a model name (such as "Model A" or "Model B"), a parameter number and a critical thrust load with respect to each motor may be stored in critical thrust load storing part 22. For example, the relationship may be represented by a table 40 corresponding to the type of each motor. By virtue of this, when the operator selects and inputs the type (the model name or the parameter number) of the electric motor by using input section 28, etc., the critical thrust load corresponding to the type of the selected motor can be automatically set or specified. For example, model "B" or parameter number "2" is selected or input, the critical thrust load is automatically set to 10 [N].

As described above, when selecting the type of the electric motor, the model name of the electric motor (such as "Model A" or "Model B") may be selected. Alternatively, the model number (or the parameter number) may be assigned to each type of the electric motor, and the model number may be set or selected so as to select the type of the electric motor. In addition, the operator may directly input a value of the critical thrust load so as to store the critical thrust load in critical thrust load storing part 22.

Torque limiting part 24 compares the thrust load of electric motor obtained by thrust load obtaining part 20 and the critical thrust load of electric motor 12 stored in critical thrust load storing part 22 at predetermined timing or time intervals. Then, when the obtained thrust load exceeds the stored critical thrust load, torque limiting part 24 electrically limits the torque of electric motor 12 (in the illustrated embodiment, torque limiting part 24 transmits a torque command to amplifier 26 for limiting the torque of electric motor 12) so that the obtained thrust load does not exceeds (or falls below) the critical thrust load. In addition, torque limiting part 24 may be constituted as a part of control section 18, and thus the torque of electric motor 12 can be rapidly lowered without using a torque limiter, etc. Therefore, in the present invention, electric motor 12 can be appropriately protected from overload without disengaging gear 16 from drive shaft 14 and without stopping electric motor 12.

According to the present invention, it is not necessary to disengage specific members from each other in order to prevent the motor being damaged due to excessive thrust load, and thus a recovery operation for the motor is not necessary. Since the torque of the electric motor is limited so that the thrust load does not exceed the critical thrust load, it is not necessary to stop or suspend the unit (or the electric motor). Therefore, the motor unit can be continuously operated, whereby productivity of the unit may be improved. Further, the torque of the electric motor can be electrically limited without using a torque limiter, etc., the number of components of the unit may be reduced and the unit may be compact.

While the invention has been described with reference to specific embodiments chosen for the purpose of illustration, it should be apparent that numerous modifications could be made thereto, by one skilled in the art, without departing from the basic concept and scope of the invention.

The invention claimed is:
1. A geared motor unit, comprising:
    an electric motor;
    a gear connected to the electric motor so that a thrust load is applied to the electric motor when transmitting a torque; and
    a control section which controls the electric motor,
    wherein the control section comprises:
        a thrust load obtaining part which obtains a thrust load of the electric motor;
        a critical thrust load storing part which stores a critical thrust load of the electric motor; and
        a torque limiting part which electrically limits the torque of the electric motor when the thrust load of the electric motor obtained by the thrust load obtaining part exceeds the critical thrust load of the electric motor stored in the critical thrust load storing part.
2. The geared motor unit as set forth in claim 1, wherein the thrust load obtaining part calculates the thrust load of the electric motor based on the torque of the electric motor obtained by the control section and information regarding a dimension of the gear.
3. The geared motor unit as set forth in claim 1, wherein the thrust load obtaining part obtains the thrust load of the electric motor as a detected value of a thrust load detector which detects the thrust load of the electric motor.
4. The geared motor unit as set forth in claim 1, wherein the critical thrust load storing part stores a value of the critical thrust load which is predetermined depending on a type of the electric motor.

* * * * *